July 29, 1924.

E. BLUMER

WINDSHIELD CLEANER

Filed April 19 1923   2 Sheets-Sheet 1

1,503,346

Edward Blumer
INVENTOR

BY Victor J. Evans
ATTORNEY

WITNESS:

July 29, 1924.
E. BLUMER
WINDSHIELD CLEANER
Filed April 19, 1923 2 Sheets-Sheet 2
1,503,346
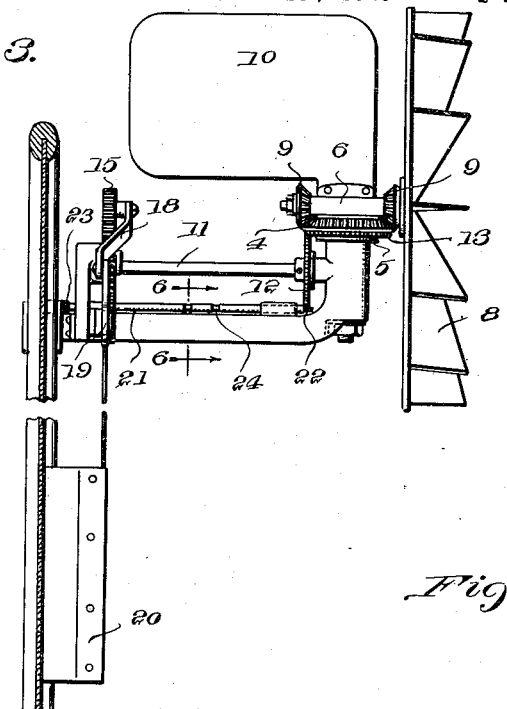
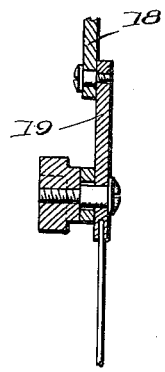
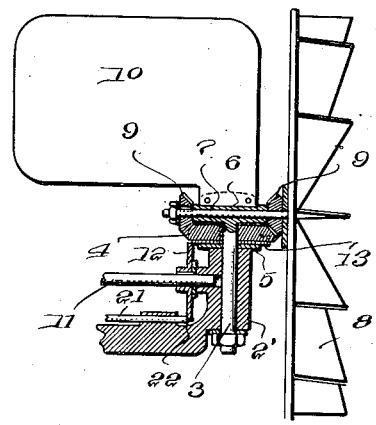
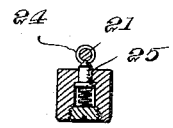
Edward Blumer
INVENTOR
BY Victor J. Evans
ATTORNEY Patented July 29, 1924.

1,503,346

UNITED STATES PATENT OFFICE.

EDWARD BLUMER, OF DAYTON, OHIO.

WINDSHIELD CLEANER.

Application filed April 19, 1923. Serial No. 633,181.

*To all whom it may concern:*

Be it known that I, EDWARD BLUMER, a citizen of the United States, residing at Dayton, in the county of Montgomery and State of Ohio, have invented new and useful Improvements in Windshield Cleaners, of which the following is a specification.

This invention relates to a windshield wiper, the general object of the invention being to provide a wind wheel for operating the wiper, the wheel being actuated by the air currents.

Another object of the invention is to provide means for locking the wheel against movement when it is not desired to use the wiper.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a side view.

Figure 4 is a section on line 4—4 of Figure 1.

Figure 5 is a section on line 5—5 of Figure 1.

Figure 6 is a section on line 6—6 of Figure 3.

Figure 1:
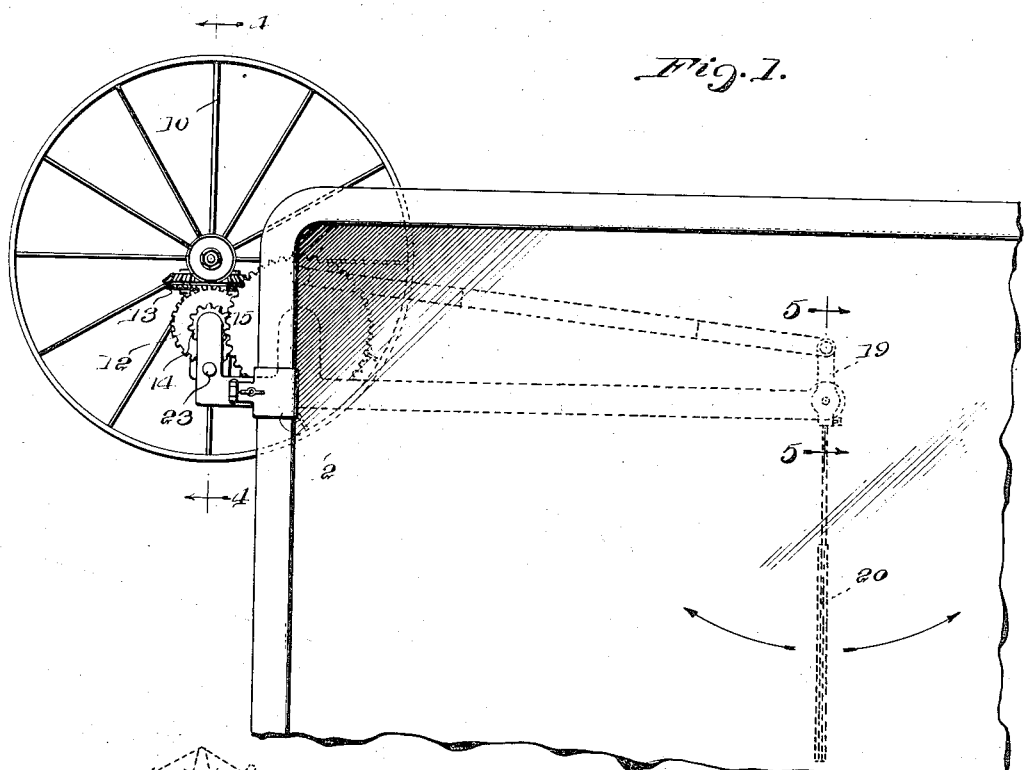
Figure 1 is a fragmentary view of a shield showing the invention in use.
Figure 2:
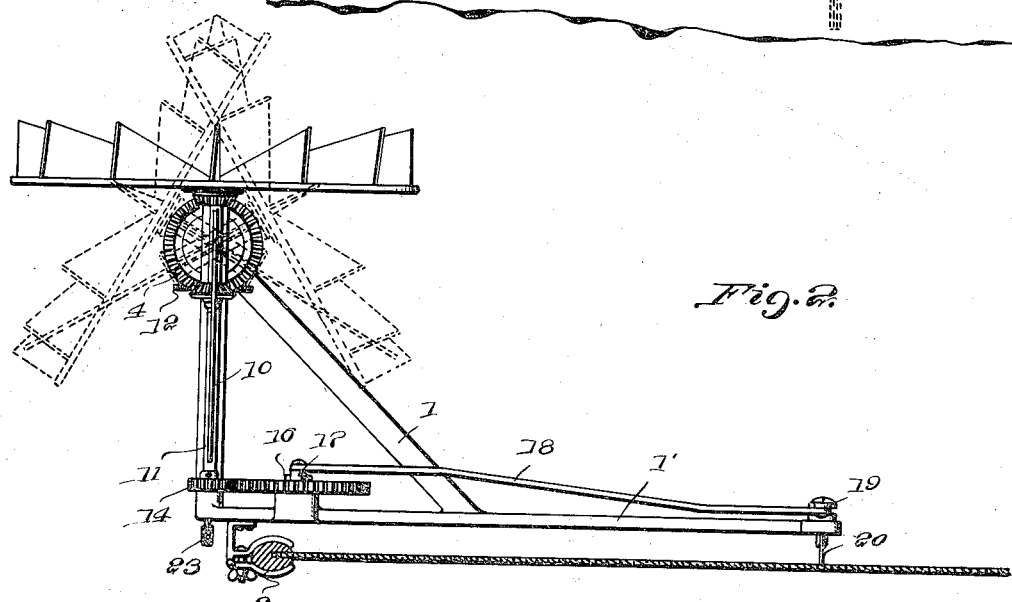
Figure 2 is a top plan view with the wind shield in section.

In these views 1 indicates a frame which is provided with a clamp 2 so that it can be clamped to a windshield of a motor vehicle as shown in the drawings. However, the device can be used on locomotives, electric cars and in other situations as I do not wish to limit its use upon a motor vehicle. The frame includes a vertical bearing 2' through which a shaft 3 passes. A bevel gear 4 is placed on the upper end of said shaft and rests upon a washer 5 on the upper end of the bearing. A bearing 6 is suitably attached to the upper end of the shaft 3 and a small shaft 7 passes through this bearing and has attached to one end thereof the windwheel 8. This shaft 7 carries the bevel pinions 9 which are arranged one at each end of the bearing 6 so that they engage opposite sides of the gear 4. The rear pinion is keyed to the shaft, the other being loose thereon. A vane 10 is attached to the bearing 6 so as to keep the wheel in the wind. A shaft 11 is journaled in the frame and this shaft carries a gear 12 which meshes with a gear 13 attached to the bottom of the gear 4 so that the movement of the gear 4 will be communicated to the shaft 11 through the gears 12 and 13. The other end of the shaft 11 carries a pinion 14 which meshes with a gear 15 on a stub shaft 16 and this gear 15 carries a crank pin 17 to which a pitman 18 is pivoted, the other end of the pitman being pivoted to an arm 19 which is pivoted to an extension 1' of the frame, said extension extending parallel with the windshield and close enough to the glass of the shield so that the wiper 20 which is attached to the arm 19 can engage the same.

From the above it will be seen that the movement of the wind wheel will be communicated to the wiper through the gears and shafts and the pitman so that the wiper is oscillated and thus wipe the shield. The wind wheel will be actuated from the wind created by the motion of the vehicle and when the wiper is not needed I provide means for preventing movement of the wind wheel, such means consisting of a sliding rod 21 which has a pointed end 22 for engaging the teeth of the gear 12 when pushed inwardly, said rod having a handle 23 at its other end for permitting it to be manipulated. The rod is provided with a pair of annular grooves 24 which are adapted to be engaged by a spring plunger 25 on the frame to hold it in either operative or inoperative position.

It will be seen that with this invention the windshield can be kept free of moisture by air current while the car is traveling along. This will render the use of electric motors or the like unnecessary.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a frame, a vertical shaft journaled therein, a horizontal bearing connected with the top of the shaft, a gear loosely mounted on the shaft and resting against a part of the frame, a horizontal shaft passing through the bearing, a wind wheel attached to said shaft, a gear connected with the horizontal shaft and engaging the first mentioned gear, a crank wheel, means for connecting the same with the first mentioned gear, an oscillating arm, a pitman connecting the same with the crank of the wheel and a wiper carried by said arm.

2. A device of the class described comprising a frame, a vertical shaft journaled therein, a horizontal bearing connected with the top of the shaft, a gear loosely mounted on the shaft and resting against a part of the frame, a horizontal shaft passing through the bearing, a wind wheel attached to said shaft, a gear connected with the horizontal shaft and engaging the first mentioned gear, a crank wheel, means for connecting the same with the first mentioned gear, an oscillating arm, a pitman connecting the same with the crank of the wheel, a wiper carried by said arm and means for preventing the rotation of the wind wheel when desired.

In testimony whereof I affix my signature.

EDWARD BLUMER.